United States Patent

Rallison

[11] Patent Number: 5,864,326
[45] Date of Patent: *Jan. 26, 1999

[54] DEPIXELATED VISUAL DISPLAY

[75] Inventor: Richard Dennis Rallison, Paradise, Utah

[73] Assignee: i-O Display Systems LLC, Menlo Park, Calif.

[*] Notice: This patent issued on a continued prosecution application filed under 37 CFR 1.53(d), and is subject to the twenty year patent term provisions of 35 U.S.C. 154(a)(2).

The term of this patent shall not extend beyond the expiration date of Pat. No. 5,303,085.

[21] Appl. No.: 307,669

[22] PCT Filed: Feb. 7, 1994

[86] PCT No.: PCT/US94/01390

§ 371 Date: Apr. 21, 1995

§ 102(e) Date: Mar. 21, 1995

Related U.S. Application Data

[60] Continuation-in-part of Ser. No. 152,215, Nov. 19, 1993, abandoned, which is a division of Ser. No. 832,237, Feb. 7, 1992, Pat. No. 5,303,085.

[51] Int. Cl.$^6$ ........................................... G09G 5/00
[52] U.S. Cl. ................. 345/7; 359/631; 359/630
[58] Field of Search .................. 345/7; 348/53; 359/54, 631, 630; 362/32

[56] References Cited

U.S. PATENT DOCUMENTS

| | | | |
|---|---|---|---|
| D. 300,476 | 3/1989 | Sestak | D29/18 |
| D. 301,644 | 6/1989 | Sestak | D29/18 |
| D. 334,557 | 4/1993 | Hunter et al. | D14/114 |
| D. 334,742 | 4/1993 | Hunter et al. | D14/113 |
| D. 337,320 | 7/1993 | Hunter et al. | D14/113 |

(List continued on next page.)

FOREIGN PATENT DOCUMENTS

| | | | |
|---|---|---|---|
| 91309198 | 10/1991 | European Pat. Off. | |
| 0 461 942 A1 | 12/1991 | European Pat. Off. | G09B 9/32 |
| 2517916 | 6/1983 | France | H04N 9/54 |

(List continued on next page.)

OTHER PUBLICATIONS

Assenheim et al., "Large–Screen–Projection, Avionic, and Helmet–Mounted Displays", Proceedings, The International Society for Optical Engineering, Feb. 26–28, 1991, vol. 1456, pp. 179–190.

Benton, "Practical Holography VIII", Proceedings, The International Society for Optical Engineering, Feb. 7–9, 1994, vol. 2176, pp. 241–248.

Driscoll et al., *Handbook of Optics*, McGraw–Hill Book company, 1978, p. 13–6.

Fischer, "Fundamentals and Optics for Head Mounted Displays", Photonics West '95, Feb. 4–10, 1995.

(List continued on next page.)

*Primary Examiner*—Richard A. Hjerpe
*Assistant Examiner*—Ricardo Osorio
*Attorney, Agent, or Firm*—Sheridan Ross P.C.

[57] ABSTRACT

The depixelated visual display relates to visual displays which combine generated images with the view of the environment surrounding a user and transmit such combined visual information to the eye position of the user. Image generators, such as a cathode ray tube and a liquid crystal display, produce an image composed of a multiplicity of pixels in a plane. The dark area between pixels becomes more prominent in a visual display. To eliminate this dark area while conserving photons, the depixelated visual display has a crossed diffraction grating (1) placed parallel to the pixel plane of the image generator on the side from which light exits the pixels. Prior techniques for depixelation had not controlled the direction into which image light is diffracted, as does the crossed diffraction grating (1), and, unlike the crossed diffraction grating (1), required sources of light which create heat that can be detrimental to a liquid crystal display.

37 Claims, 3 Drawing Sheets

U.S. PATENT DOCUMENTS

| | | | |
|---|---|---|---|
| D. 338,514 | 8/1993 | Holmes | D21/240 |
| 2,955,156 | 10/1960 | Heilig | 178/6.5 |
| 3,043,910 | 7/1962 | Hicks | 178/7.85 |
| 3,589,795 | 6/1971 | Miyazaki et al. | 350/96 B |
| 3,614,314 | 10/1971 | Rossire | 178/7.88 |
| 3,737,212 | 6/1973 | Antonson et al. | 350/174 |
| 3,874,783 | 4/1975 | Cole | 350/96 B |
| 3,915,548 | 10/1975 | Opittek et al. | 350/3.5 |
| 3,923,370 | 12/1975 | Mostrom | 350/55 |
| 3,940,204 | 2/1976 | Withrington | 350/3.5 |
| 4,028,725 | 6/1977 | Lewis | 358/103 |
| 4,042,957 | 8/1977 | Ellis | 358/109 |
| 4,048,653 | 9/1977 | Spooner | 358/104 |
| 4,257,062 | 3/1981 | Meredith | 358/81 |
| 4,269,476 | 5/1981 | Gauthier et al. | 350/174 |
| 4,310,849 | 1/1982 | Glass | 358/88 |
| 4,322,135 | 3/1982 | Greeman | 350/410 |
| 4,348,185 | 9/1982 | Breglia et al. | 434/43 |
| 4,361,384 | 11/1982 | Bosserman | 350/174 |
| 4,385,803 | 5/1983 | Ellis | 350/174 |
| 4,395,731 | 7/1983 | Schoolman | 358/88 |
| 4,398,799 | 8/1983 | Swift | 350/174 |
| 4,437,113 | 3/1984 | Lee et al. | 358/93 |
| 4,439,157 | 3/1984 | Breglia et al. | 434/40 |
| 4,446,480 | 5/1984 | Breglia et al. | 358/104 |
| 4,465,347 | 8/1984 | Task et al. | 350/538 |
| 4,468,101 | 8/1984 | Ellis | 350/538 |
| 4,550,984 | 11/1985 | Reymond | 350/404 |
| 4,559,555 | 12/1985 | Schoolman | 358/88 |
| 4,561,723 | 12/1985 | Hamano et al. | 350/331 R |
| 4,571,628 | 2/1986 | Thornton | 358/224 |
| 4,636,866 | 1/1987 | Hattori | 358/236 |
| 4,641,931 | 2/1987 | Loy | 350/538 |
| 4,651,201 | 3/1987 | Schoolman | 358/98 |
| 4,652,870 | 3/1987 | Steward | 340/705 |
| 4,695,129 | 9/1987 | Faessen et al. | 350/96.25 |
| 4,706,117 | 11/1987 | Schoolman | 358/88 |
| 4,711,512 | 12/1987 | Upatnieks | 350/3.7 |
| 4,737,972 | 4/1988 | Schoolman | 378/41 |
| 4,743,200 | 5/1988 | Welch et al. | 434/43 |
| 4,753,514 | 6/1988 | Kubik | 350/174 |
| 4,757,714 | 7/1988 | Purdy et al. | 73/597 |
| 4,761,056 | 8/1988 | Evans et al. | 350/174 |
| 4,763,990 | 8/1988 | Wood | 350/320 |
| 4,775,217 | 10/1988 | Ellis | 350/538 |
| 4,786,966 | 11/1988 | Hanson et al. | 358/108 |
| 4,796,987 | 1/1989 | Linden | 351/158 |
| 4,797,736 | 1/1989 | Kloots et al. | 358/93 |
| 4,799,765 | 1/1989 | Ferrer | 350/174 |
| 4,805,988 | 2/1989 | Dones | 350/137 |
| 4,806,011 | 2/1989 | Bettinger | 351/158 |
| 4,807,202 | 2/1989 | Cherri et al. | 367/129 |
| 4,826,287 | 5/1989 | Cook et al. | 350/174 |
| 4,853,764 | 8/1989 | Sutter | 358/3 |
| 4,859,030 | 8/1989 | Rotier | 350/174 |
| 4,859,031 | 8/1989 | Berman et al. | 350/174 |
| 4,867,551 | 9/1989 | Perera | 351/158 |
| 4,869,575 | 9/1989 | Kubik | 350/174 |
| 4,874,214 | 10/1989 | Cheyason et al. | 350/3.7 |
| 4,874,235 | 10/1989 | Webster | 351/201 |
| 4,884,137 | 11/1989 | Hanson et al. | 358/108 |
| 4,884,219 | 11/1989 | Waldren | 364/514 |
| 4,897,715 | 1/1990 | Beamon | 358/93 |
| 4,900,133 | 2/1990 | Berman | 350/346 |
| 4,902,083 | 2/1990 | Wells | 350/6.6 |
| 4,902,116 | 2/1990 | Ellis | 350/501 |
| 4,902,120 | 2/1990 | Weyer | 351/158 |
| 4,904,049 | 2/1990 | Hegg | 350/96.27 |
| 4,907,132 | 3/1990 | Parker | 362/32 |
| 4,930,888 | 6/1990 | Freisleben et al. | 356/152 |
| 4,932,731 | 6/1990 | Suzuki et al. | 350/3.7 |
| 4,933,755 | 6/1990 | Dahl et al. | 358/88 |
| 4,934,773 | 6/1990 | Becker | 350/6.6 |
| 4,952,024 | 8/1990 | Gale | 350/143 |
| 4,961,625 | 10/1990 | Wood et al. | 350/174 |
| 4,961,626 | 10/1990 | Fournier et al. | 350/174 |
| 4,968,123 | 11/1990 | Fournier et al. | 350/538 |
| 4,969,714 | 11/1990 | Fournier et al. | 353/174 |
| 4,969,724 | 11/1990 | Ellis | 350/503 |
| 4,970,589 | 11/1990 | Hanson et al. | 358/108 |
| 4,982,278 | 1/1991 | Dahl et al. | 358/88 |
| 4,983,014 | 1/1991 | Nattermann | 350/96.24 |
| 4,984,179 | 1/1991 | Waldern | 364/514 |
| 4,993,790 | 2/1991 | Vick | 350/3.73 |
| 4,995,165 | 2/1991 | Daniels | 33/361 |
| 5,003,300 | 3/1991 | Wells | 340/705 |
| 5,005,213 | 4/1991 | Hanson et al. | 455/617 |
| 5,019,828 | 5/1991 | Schoolman | 342/457 |
| 5,034,809 | 7/1991 | Katoh | 358/88 |
| 5,035,473 | 7/1991 | Kuwayama et al. | 350/3.7 |
| 5,039,198 | 8/1991 | VanBeek | 385/117 |
| 5,046,827 | 9/1991 | Frost et al. | 359/54 |
| 5,050,966 | 9/1991 | Berman | 359/38 |
| 5,053,755 | 10/1991 | Smith et al. | 340/705 |
| 5,081,542 | 1/1992 | Efron et al. | 359/41 |
| 5,089,903 | 2/1992 | Kuwayama et al. | 359/15 |
| 5,091,719 | 2/1992 | Beamon | 340/705 |
| 5,123,726 | 6/1992 | Webster | 351/201 |
| 5,124,821 | 6/1992 | Antier et al. | 359/14 |
| 5,129,716 | 7/1992 | Holakovszky et al. | 351/50 |
| 5,130,794 | 7/1992 | Ritchey | 358/87 |
| 5,138,555 | 8/1992 | Albrecht | 364/424.06 |
| 5,151,722 | 9/1992 | Massof et al. | 351/158 |
| 5,162,828 | 11/1992 | Furness et al. | 353/122 |
| 5,162,928 | 11/1992 | Taniguchi et al. | 359/13 |
| 5,164,848 | 11/1992 | Firth et al. | 359/13 |
| 5,166,778 | 11/1992 | Beamon | 358/3 |
| 5,170,153 | 12/1992 | Migozzi et al. | 340/705 |
| 5,184,231 | 2/1993 | Ellis | 359/13 |
| 5,189,512 | 2/1993 | Cameron et al. | 358/93 |
| 5,192,960 | 3/1993 | Komamura | 351/41 |
| 5,198,928 | 3/1993 | Chauvin | 359/465 |
| 5,200,844 | 4/1993 | Suvada | 359/40 |
| 5,231,379 | 7/1993 | Wood et al. | 340/705 |
| 5,255,211 | 10/1993 | Redmond | 364/578 |
| 5,274,405 | 12/1993 | Webster | 351/158 |
| 5,276,471 | 1/1994 | Yamauchi et al. | 351/153 |
| 5,278,680 | 1/1994 | Karasawa et al. | 359/40 |
| 5,281,957 | 1/1994 | Schoolman | 345/8 |
| 5,293,271 | 3/1994 | Merritt et al. | 359/858 |
| 5,300,942 | 4/1994 | Dolgoff | 345/32 |
| 5,303,085 | 4/1994 | Rallison | 359/631 |
| 5,305,244 | 4/1994 | Newman et al. | 364/708.1 |
| 5,320,538 | 6/1994 | Baum | 434/307 |
| 5,321,416 | 6/1994 | Bassett et al. | 345/8 |
| 5,322,441 | 6/1994 | Lewis et al. | 434/307 |
| 5,323,174 | 6/1994 | Klapman et al. | 345/156 |
| 5,327,175 | 7/1994 | Kim | 348/526 |
| 5,331,149 | 7/1994 | Spitzer et al. | 250/221 |
| 5,334,991 | 8/1994 | Wells et al. | 345/8 |
| 5,335,299 | 8/1994 | Atkinson | 382/56 |
| 5,347,400 | 9/1994 | Hunter | 359/815 |
| 5,353,042 | 10/1994 | Klapman et al. | 345/156 |
| 5,357,372 | 10/1994 | Chen et al. | 359/637 |
| 5,392,158 | 2/1995 | Tosaki | 359/633 |
| 5,408,346 | 4/1995 | Trissel et al. | 359/65 |
| 5,451,976 | 9/1995 | Ito | 345/8 |
| 5,526,184 | 6/1996 | Tokuhashi et al. | 359/630 |

FOREIGN PATENT DOCUMENTS

| | | | |
|---|---|---|---|
| 224691 | 7/1910 | Germany | 341/20 |
| 3532730 | 3/1987 | Germany | A61B 1/04 |

| | | | | |
|---|---|---|---|---|
| 3628458 | 2/1988 | Germany | H04N | 1/20 |
| 4225589A1 | 2/1994 | Germany | G09F | 9/00 |
| 59-117889 | 7/1984 | Japan | H04N | 9/54 |
| 59-219092 | 12/1984 | Japan | H04N | 9/54 |
| 62-272698 | 11/1987 | Japan . | | |
| 63-82192 | 4/1988 | Japan . | | |
| 63-177689 | 7/1988 | Japan . | | |
| 1-61723 | 3/1989 | Japan . | | |
| 5-46161 | 2/1993 | Japan | G09G | 5/36 |
| 2 143 948 A | 2/1985 | United Kingdom | G01C | 1/00 |
| 2266385 | 10/1993 | United Kingdom | G02B | 23/10 |
| 2270775 | 3/1994 | United Kingdom | G02B | 27/02 |
| 2 279 201 | 12/1994 | United Kingdom | H04R | 1/10 |
| 2 281 846 | 3/1995 | United Kingdom | A45F | 3/00 |
| WO 94/11855 | 5/1964 | WIPO | G09G | 3/02 |
| 84/01680 | 4/1984 | WIPO | H04N | 5/64 |
| WO 92/03756 | 3/1992 | WIPO | G02B | 27/00 |
| 93/23783 | 11/1993 | WIPO . | | |
| WO 94/14152 | 6/1994 | WIPO | G09G | 3/02 |
| WO 94/24658 | 10/1994 | WIPO | G09G | 3/02 |
| WO 95/10061 | 4/1995 | WIPO | G02B | 26/10 |
| WO 95/10106 | 4/1995 | WIPO | G09G | 3/02 |

OTHER PUBLICATIONS

Rotier, "Optical Approaches to the Helmet Mounted Display", *SPIE*, 1989, vol. 1116, pp.14–17.

Sony, "Visortron"advertisement.

"Survey of Head Mounted Displays", *Real Time Graphics*, Aug. 1994, vol. 3, No. 2, pp. 1, 8–12.

Virtual I/O, Inc., "PDS Gamer®" advertisement.

*VR News*, Dec. 1994, vol. 3, Issue 10, pp. 4, 8, 12.

"Airlines Weigh Benefits, Costs of At–Seat Video", *Aviation Week & Space Technology*, Aug. 15, 1994, pp. 44–45.

Pope, "Say ahhh! Videos help you relax", *The Times–Picayune*, Oct. 25, 1994, p. 1, A–6.

Farmer, "The right solution to the right problem . . . now", *Comdex Daily*, Nov. 15, 1994, p. 4.

Siggraph, *Nikkei Electronics*, Aug. 22, 1994, pp. 13–14.

Virtual I/O, "i–glasses!", *Twice CES Daily*, Jan. 6, 1995, p. 30.

Virtual I/O, Specifications, *Virtual Reality World*, Nov./Dec. 1994, p. 11.

Virtual I/O, *VR News*, Aug./Sep. 1994, p. 17.

Foley, Interfaces for Advanced Computing, *Scientific American*, Oct. 1987, vol. 257, No. 4, pp. 126–135.

Krueger, *Artificial Reality II*, 1991 Addison–Wesley Publishing Company, Inc., pp. 66–82, 102–116, 130–149, 179–182, 237–239, 267–279.

Sutherland, "A head–mounted three dimensional display", Fall Joint Computer Conference, 1968, pp. 757–763.

Antonoff, "Real estate is cheap here, but the places you'd most want to visit are still under construction", *Popular Science*, Jun. 1993, pp. 83–86, 124–125.

Burley, et al., "A full–color wide–field–of–view holographic helmet–mounted display for pilot/vehicle interface development and human factors studies", *SPIE*, vol. 1290 Helmut–Mounted Displays II (1990), pp. 9–15.

Carr, "Is Virtual Reality Virtually Here?", *Training & Development*, Oct. 1992, pp. 37–41.

Fisher et al., "Living in a Virtual World", *BYTE*, Jul. 1990, pp. 215–221.

Horn, "Seeing the invisible", *U.S. News & World Report*, Jan. 28, 1991.

James, "Goggles Brighten Dark Subway", *The New York Times*, Apr. 10, 1992.

Jones et al., "Evaluation of conformal and body–axis attitude information for spatial awareness", *SPIE*, vol. 1695 Helmet–Mounted Displays III (1992), pp. 146–153.

Starks, "Stereoscopic video and the quest for virtual reality: an annotated bibliography of selected topics", *SPIE*, vol. 1457 Stereoscopic Displays and Applications II (1991), pp. 327–343.

Stewart, "Through the looking glass into an artificial world—via computer", *Smithsonian*, vol. 21, No. 10, Jan. 1991, pp. 36–45.

DEPIXELATED VISUAL DISPLAY

The present Application is a continuation-in-part of application Ser. No. 08/152,215, file Nov. 12, 1993 now abandoned, which is a divisional of Ser. No. 07/832,237 filed Feb. 7, 1992, now U.S. Pat. No. 5,303,085. Parent Application 08/152,215 was abandoned in favor of Continuation Application 08/468,050. The present application is the U.S. National Phase of PCT/US94/01390 filed Feb. 7, 1994.

TECHNICAL FIELD

This invention relates to visual displays which combine generated images with the view of the environment surrounding a user and transmit such combined visual information to the eye position of the user.

BACKGROUND ART

It is often desirable to provide visual information to a living being, usually a person. Frequently one wishes to superimpose such visual information upon the being's view of the real world.

Such a display requires, in a form known as a folded catadioptric display, an image generator; a beam splitter, which receives the image light from the image generator and sends a fraction, designated the reflected fraction, of such image light to a reflective combiner that both allows light from the real world to pass through such combiner and reflects the image light such that both the real-world light and the image light are transmitted to the eye of the user through the beam splitter.

The beam splitter will transmit a fraction, designated the transmitted fraction, of the image light reflected from the collimator-combiner. Of course, only a fraction of the real-world light is also transmitted by the beam splitter.

To correct for aberrations and distortions produced by the beam splitter and the combiner, a correction lens is often placed in the optical path between the image generator and the beam splitter.

Another beneficial process in a visual display is depixelation of the image.

The image generators that are well known in the art, such as a cathode ray tube and a liquid crystal display, produce an image composed of a multiplicity of pixels. Each pixel is a point of light. Since adjacent pixels do not contact each other, every pixel is surrounded by a dark area. The combiner magnifies the image, causing the dark area to be perceptible and thereby detracting from the accurate portrayal of the image one wishes to depict.

Depixelation traditionally comprises blurring the edges of the pixels without losing resolution or contrast. In fact, perceived resolution—although necessarily somewhat subjective—appears to be increased by depixelation. And, in the case of triads of colored pixels, depixelation blends the colors together.

In U.S. application Ser. No. 07/832,237, the inventor achieves depixelation of a liquid crystal display through the placement of a fiber optic faceplate between the liquid crystal display and the beam splitter, a fold mirror in that case, in such a manner that the input numerical aperture of the faceplate is approximately equal to twice the pixel size of the liquid crystal display divided by the distance between the fiber optic faceplate and the pixels.

A second process for achieving depixelation with a fiber optic faceplate involves simply placing the source of light for the liquid crystal display near the rear of the pixel plane of the liquid crystal display. Since the input surface of the faceplate is a finite distance in front of the pixel plane of the liquid crystal display, the image of each pixel on the input surface of the faceplate is not only enlarged, but also covers a greater portion of the total picture, correspondingly decreasing the amount of dark area surrounding each pixel. Also, the small size of each pixel causes considerable diffraction of the light which passes the edge of the pixel.

A common and third technique for depixelation is locating a weak diffuser plate a short distance from the pixels, in the direction of the beam splitter.

DISCLOSURE OF INVENTION

The diffusion produced by the weak diffuser plate is, however, in random directions, as is the diffraction associated with the edge of the pixels, which was discussed above with respect to the second technique for depixelation.

And when a fiber optic faceplate is utilized, a diffuse source of light cannot be employed because it would create an image of each pixel on the input surface of the faceplate which would be excessively large. This forces the use of an incandescent lamp, which produces more heat; and heat can negatively affect liquid crystal displays.

The present invention introduces a new type of depixelator.

The inventive concept of this depixelator lies in the recognition that the desired goal of depixelation, i.e., elimination of the perceived dark area surrounding each pixel, can be accomplished with a more efficient use of photons if light can be diffracted in controlled directions, Moreover, since the technique, as described below, employs no fiber optic faceplate, a diffuse source of light can be used. Two examples of such a source are a glow lamp, which is a tiny fluorescent lamp that produces a nearly white spectrum while operating at nearly one thousand volts but consuming much less than one milliampere of current, and a woven fiber optic mat fed by a remote halogen lamp.

This controlled diffraction is accomplished by placing a crossed diffraction grating parallel to the pixel plane on the side from which light exits the pixels, i.e., in a folded catadioptric display, between the pixel plane, of the image generator, and the beam splitter. First order diffracted light produces eight images of a given pixel with the pixel, when viewed through the crossed grating, being in the center of the eight images. The second-order diffracted light creates sixteen images of the pixel which, when viewed through the crossed grating, are displaced farther from the pixel than are the first order images. The pixel appears in the center of these sixteen second-order images and is, thus, centered among the total twenty-four images.

The crossed diffraction grating, as its name suggests and as is well known in the art, is constructed to have a first spatial frequency in one direction and a second spatial frequency in the perpendicular direction. If the pixels are square, then the first and second spatial frequencies are made equal to one another. If the pixels are rectangular, the first and second spatial frequencies differ from one another.

Since the first-order images are the closest to the pixel, more than h the total light from the pixel goes into the first-order depixelation pattern. One fourth to one third of the light from the pixel goes into the second-order diffraction pattern; a lower amount of light is selected since the second-order images are farther from the pixel than are the first-order images. This is accomplished by adjusting the modulation depth of the crossed grating to fall within the range of eighty percent to one hundred twenty percent.

The crossed grating may be made as either a surface grating or a volume holographic grating. Preferably, the grating is a sinusoidal or slightly squared grating so that the power is concentrated in the +1 and −1 orders and their products, rather than in higher even orders or single-sided orders that may result from sawtooth or triangular gratings.

By selecting the proper spatial frequency for the grating, the angular distribution will be such that the overall image of a square pixel will be a square with the pixel at its center, eight squares composed of first-order images surrounding the pixel, and sixteen squares composed of second-order images surrounding the inner eight first-order images such that there is only a minimal gap between, and no overlap with, any of the squares generating the overall image.

If the pixel is rectangular, then the overall image, as well as the first-order and second-order images of which it is composed, is rectangular.

To accomplish this effect, the spatial frequency multiplied by the shortest wavelength of the image light that is used should approximately equal the center-to-center distance between adjacent pixels in the pixel plane of the image generator divided by twice the optical distance between the crossed diffraction grating and the pixel plane.

Since the grating is aligned parallel to the pixel plane, there will be one center-to-center distance measured perpendicularly to the tops and bottoms of the pixels and a second center-to-center distance measured perpendicularly to the sides of the pixels. This yields the first and second spatial frequencies discussed above.

Of course, the overall image thus generated of one pixel overlaps the overall image thus produced of an adjacent pixel, thereby achieving the desired depixelation.

If the folded catadioptric display incorporates a corrective lens, such a lens is a plano convex lens with the flat surface oriented toward the pixel plane of the image generator. The crossed diffraction grating can optionally be formed on the flat surface of the correction lens.

Similarly, some folded catadioptric displays utilize one or more wave plates between the image generator and the beam splitter to change the polarization of the light. In such a case, the crossed diffraction grating can be produced on the surface of the closest wave plate to the image generator that is directed toward the pixel plane of the image generator.

The technique of utilizing a crossed diffraction grating for depixelation may be utilized with any liquid crystal display or, since they have shadow masks, multi-color cathode ray tube.

BEST MODE FOR CARRYING OUT THE INVENTION

Figure 1:
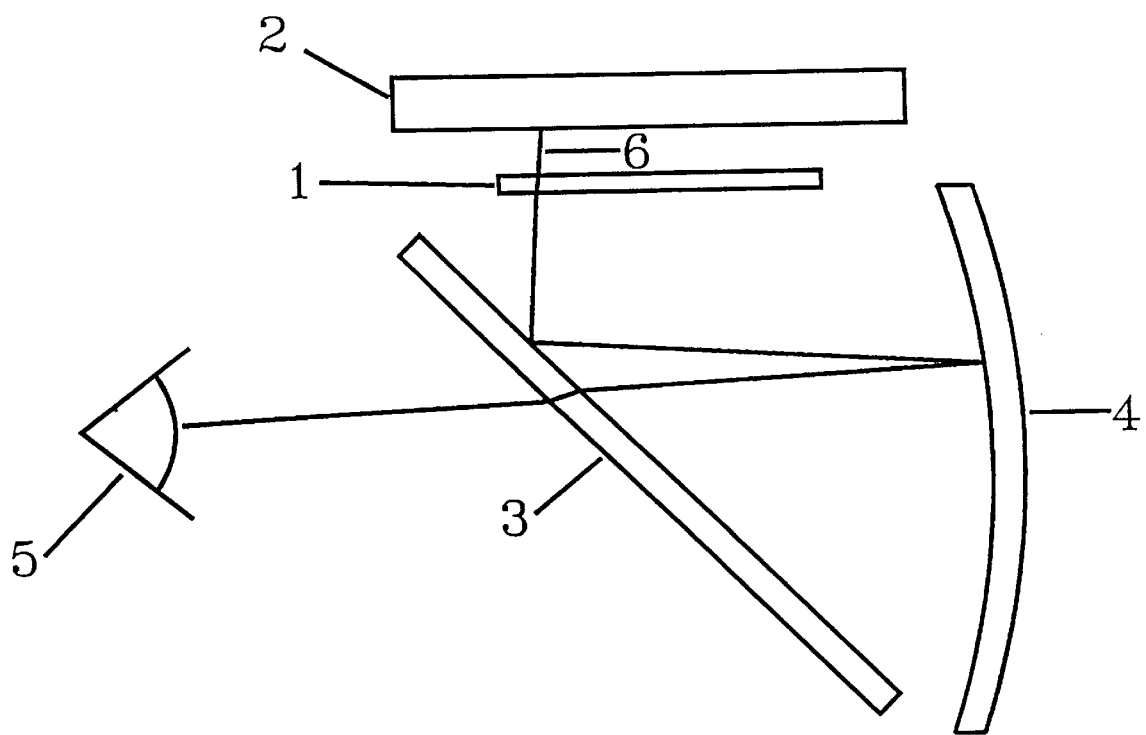
FIG. 1 portrays the depixelated visual display employing the crossed diffraction grating.

The depixelated visual display comprises, as shown in FIG. 1, a crossed diffraction grating (1) located parallel to the pixel plane of an image generator to receive, diffract, and transmit, and thereby depixelate, the image light from an image generator (2); a fold mirror (3) positioned to receive the depixelated image light from the crossed diffraction grating (1) and to reflect such depixelated image light; and a reflective combiner (4) situated to receive the depixelated image light from the fold mirror (3), reflect such depixelated image light, combine such depixelated image light with light rays transmitted through the reflective combiner (4) from the surrounding environment, and transmit the combined environmental light rays and depixelated image light through the fold mirror (3) to the eye position (5) of the user. The optical path (6) of the image light is depicted in FIG. 1.

Preferably, the spatial frequency of the crossed diffraction grating (1) is constructed such that this spatial frequency multiplied by the shortest wavelength of the image light that is used approximately equals the center-to-center distance between adjacent pixels in the pixel plane of the image generator (2) divided by twice the optical distance between the crossed diffraction grating (1) and the pixel plane of the image generator (2).

Figure 2:
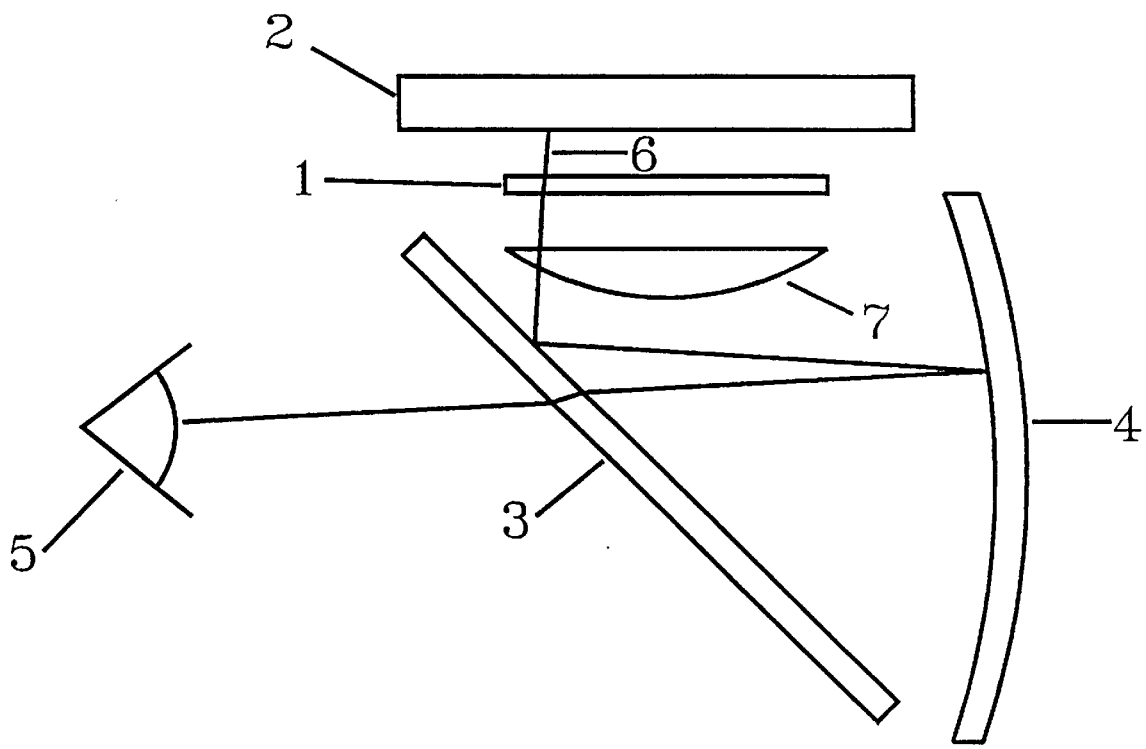
FIG. 2 illustrates a depixelated visual display using the crossed diffraction grating and including a correction lens.

An optional mode, illustrated in FIG. 2, includes a correction lens (7) placed between the crossed diffraction grating (1) and the fold mirror (3), with its flat surface oriented toward the pixel plane of the image generator, for optically correcting the depixelated image light.

Figure 3:
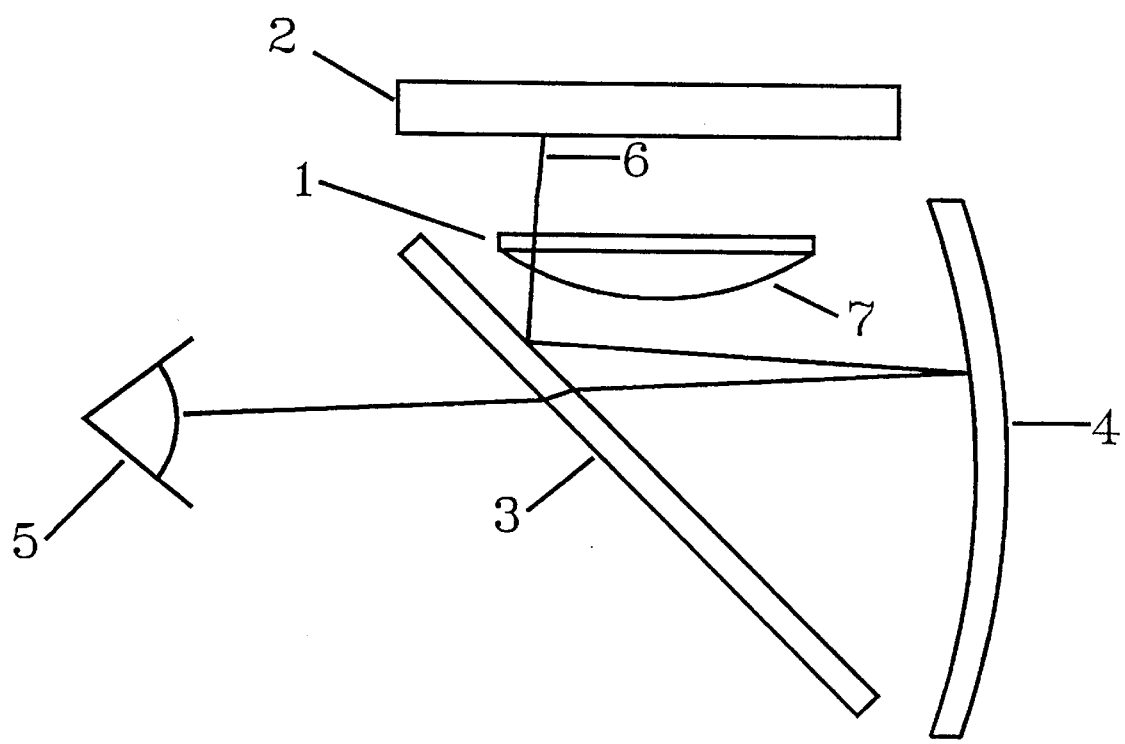
FIG. 3 shows the same depixelated visual display as FIG. 2 except that the crossed diffraction grating is attached to the correction lens.

And, as portrayed in FIG. 3, a further optional mode has the crossed diffraction grating (1) attached to the flat surface of the correction lens (7), which flat surface is oriented toward the pixel plane of the image generator (2).

For all modes it is, as discussed with respect to the mode shown in FIG. 1, preferable to construct the crossed diffraction grating (1) so that the spatial frequency of the crossed diffraction grating (1) multiplied by the shortest wavelength of the image light that is used approximately equals the center-to-center distance between adjacent pixels in the pixel plane of the image generator (2) divided by twice the optical distance between the crossed diffraction grating (1) and the pixel plane of the image generator (2).

Similarly, for all modes it is preferable that the modulation depth of the crossed diffraction grating (1) fall within the range of eighty percent to one hundred twenty percent and that the crossed diffraction grating (1) be sinusoidal or slightly squared.

INDUSTRIAL APPLICABILITY

From the preceding it is obvious how the depixelated visual display is made.

Industrial uses of the depixelated visual display include, but are not necessarily limited to, providing a heads-up display or helmet-mounted display which enables a pilot or driver of a ground vehicle, such as military tank, to receive visual information about the pilot's plane or the driver's vehicle without looking away from the surrounding outside environment.

I claim:

1. A depixelated head-mounted visual display, which comprises:

a crossed diffraction grating located parallel to the pixel plane of an image generator to receive, diffract, and transmit, and thereby depixelate, the image light from an image generator;

a fold mirror positioned to receive the depixelated image light from the crossed diffraction grating and to reflect such depixelated image light; and a reflective combiner situated to receive the depixelated image light from the fold mirror, reflect such depixelated image light, combine such depixelated image light with light rays transmitted through the reflective combiner from the surrounding environment, and transmit the combined environmental light rays and depixelated image light through the fold mirror to the eye position of the user.

2. The depixelated visual display as recited in claim 1, wherein:

the number of grating lines per unit distance of the crossed diffraction grating multiplied by the shortest wavelength of the image light that is used approximately equals the center-to-center distance between adjacent pixels in the pixel plane of the image generator divided by twice the optical distance between the crossed diffraction grating and the pixel plane of the image generator.

3. A depixelated head-mounted display, which comprises:

a crossed diffraction grating located parallel to the pixel plane of an image generator to receive, diffract, and transmit, and thereby depixelate, the image light from an image generator;

a plano convex correction lens placed, with its flat surface oriented toward the pixel plane of the image generator, to receive, optically to correct, and to transmit the depixelated image light from the crossed diffraction grating;

a fold mirror positioned to receive the depixelated image light from the correction lens and to reflect such depixelated image light; and a reflective combiner situated to receive the depixelated image light from the fold mirror, reflect such depixelated image light, combine such depixelated image light with light rays transmitted through the reflective combiner from the surrounding environment, and transmit the combined environmental light rays and depixelated image light through the fold mirror to the eye position of the user.

4. The depixelated visual display as recited in claim 3, wherein:

the crossed diffraction grating is attached to the flat surface of the correction lens.

5. The depixelated visual display as recited in claim 3, wherein:

the number of grating lines per unit distance of the crossed diffraction grating multiplied by the shortest wavelength of the image light that is used approximately equals the center-to-center distance between adjacent pixels in the pixel plane of the image generator divided by twice the optical distance between the crossed diffraction grating and the pixel plane of the image generator.

6. The depixelated visual display as recited in claim 5, wherein:

the crossed diffraction grating is attached to the flat surface of the correction lens.

7. A process for producing a depixelated head-mounted visual display image, which comprises:

locating a crossed diffraction grating parallel to the pixel plane of an image generator to receive, diffract, and transmit, and thereby depixelate, the image light from an image generator;

positioning a fold mirror to receive the depixelated image light from the crossed diffraction grating and to reflect such depixelated image light; and situating a reflective combiner to receive the depixelated image light from the fold mirror, reflect such depixelated image light, combine such depixelated image light with light rays transmitted through the reflective combiner from the surrounding environment, and transmit the combined environmental light rays and depixelated image light through the fold mirror to the eye position of the user.

8. The process for producing a depixelated visual display image as recited in claim 1, further comprising:

making the number of grating lines per unit distance of the crossed diffraction grating multiplied by the shortest wavelength of the image light that is used approximately equal to the center-to-center distance between adjacent pixels in the pixel plane of the image generator divided by twice the optical distance between the crossed diffraction grating and the pixel plane of the image generator.

9. A process for producing a depixelated head-mounted visual display image, which comprises:

locating a crossed diffraction grating parallel to the pixel plane of an image generator to receive, diffract, and transmit, and thereby depixelate, the image light from an image generator;

placing a plano convex correction lens, with its flat surface oriented toward the pixel plane of the image generator, to receive, optically to correct, and to transmit the depixelated image light from the crossed diffraction grating;

positioning a fold mirror to receive the depixelated image light from the correction lens and to reflect such depixelated image light; and situating a reflective combiner to receive the depixelated image light from the fold mirror, reflect such depixelated image light, combine such depixelated image light with light rays transmitted through the reflective combiner from the surrounding environment, and transmit the combined environmental light rays and depixelated image light through the fold mirror to the eye position of the user.

10. The process for producing a depixelated visual display image as recited in claim 9, further comprising:

attaching the crossed diffraction grating to the flat surface of the correction lens.

11. The process for producing a depixelated visual display image as recited in claim 9, further comprising:

making the number of grating lines per unit distance, of the crossed diffraction grating multiplied by the shortest wavelength of the image light that is used approximately equal to the center-to-center distance between adjacent pixels in the pixel plane of the image generator divided by twice the optical distance between the crossed diffraction grating and the pixel plane of the image generator.

12. The process for producing a depixelated visual display image as recited in claim 11, further comprising:

attaching the crossed diffraction grating to the flat surface of the correction lens.

13. In a head-mounted display having an image generator which generates a pixelated image wherein at least some pixels are spaced from adjacent pixels, depixelating apparatus comprising crossed diffraction grating placed along an optic path between said image generator and a user's eye.

14. Apparatus as claimed in claim 13, further comprising at least a first mirror for redirecting image light ultimately providing said image light to the eye of the user.

15. Apparatus as claimed in claim 14, wherein said crossed diffraction grating is positioned between said image generator and said mirror.

16. Apparatus as claimed in claim 13, wherein said crossed diffraction grating defines a first grating frequency and a second grating frequency substantially equal to said first grating frequency.

17. Apparatus as claimed in claim 13, wherein said crossed diffraction grating defines a first grating frequency and a second grating frequency substantially different from said first frequency.

18. In a head-mounted display having an image generator which generates a pixelated image wherein at least some pixels are spaced from adjacent pixels, depixelating apparatus comprising crossed diffraction grating placed along an optic path between said image generator and a user's eye, wherein a modulation depth of said crossed diffraction grating is between about 80% and about 120%.

19. Apparatus as claimed in claim 13, wherein said crossed diffraction grating includes surface grating.

20. Apparatus as claimed in claim 13, wherein said crossed diffraction grating includes a volume holographic optical element.

21. In a head-mounted display having an image generator which generates a pixelated image wherein at least some pixels are spaced from adjacent pixels, depixelating apparatus comprising crossed diffraction grating placed along an optic path between said image generator and a user's eye, wherein said crossed diffraction grating provides a central image and a plurality of orders of generated images, and wherein said crossed diffraction grating is configured such that substantially the majority of power in said plurality of orders is in the plus one and minus one orders.

22. Apparatus as claimed in claim 13, wherein said crossed diffraction grating defines a substantially sinusoidal periodic shape.

23. Apparatus as claimed in claim 13, wherein said crossed diffraction grating defines a partially squared periodic shape.

24. Apparatus as claimed in claim 13, wherein said crossed diffraction grating is provided substantially in the absence of sawtooth or triangular periodic shapes.

25. Apparatus as claimed in claim 13, wherein said crossed diffraction grating produces, for each pixel, at least a central image, a plurality of first order images and a plurality of second order images.

26. Apparatus as claimed in claim 25, wherein there is substantially no overlap between said first order and said second order images for any pixel.

27. In a head-mounted display having an image generator which generates a pixelated image wherein at least some pixels are spaced from adjacent pixels, depixelating apparatus comprising crossed diffraction grating placed along an optic path between said image generator and a user's eye, wherein said crossed diffraction grating produces, for each pixel, at least a central image, a plurality of first order images and a plurality of second order images, wherein said first order shape is substantially the same as a pixel shape.

28. Apparatus as claimed in claim 13, wherein said image generator defines a pixel plane and defines an inter-pixel distance and wherein said image generator outputs image light, defining a shortest wavelength of said image light, and wherein said crossed diffraction grating defines at least a first number of grating lines per unit distance, wherein said inter-pixel distance is approximately equal to twice the optical distance between said grating and said pixel plane times said number of grating lines per unit distance times said shortest wavelength.

29. Apparatus as claimed in claim 13, wherein said crossed diffraction grating is formed on a part of a corrective lens.

30. In a head-mounted display having an image generator which generates a pixelated image wherein at least some pixels are spaced from adjacent pixels, depixelating apparatus comprising crossed diffraction grating placed along an optic path between said image generator and a user's eye, wherein said crossed diffraction grating is formed as part of a quarter wave plate.

31. Apparatus as claimed in claim 13, further comprising a diffuse light source for transmitting light through said image generator.

32. Apparatus as claimed in claim 31, wherein said light source comprises a glow lamp.

33. Apparatus as claimed in claim 31, wherein said light source comprises a fiber optic mat fed by a remote lamp.

34. Apparatus as claimed in claim 33, wherein said remote lamp is a halogen lamp.

35. A head-mounted display comprising:

an image generator which generates a pixelated image wherein at least some pixels are spaced from adjacent pixels; and means for depixelating said image output by said image generator substantially in the absence of a diffuser plate.

36. Apparatus as claimed in claim 35, wherein said means for depixelating comprises at least a first crossed diffraction grating.

37. A method for depixelating an image comprising:

providing a head-mounted image generator which generates a pixelated image wherein at least some pixels are spaced from adjacent pixels; and depixelating said image using a crossed diffraction grating.

\* \* \* \* \*